Dec. 23, 1958 W. J. BLAZEK ET AL 2,865,259
ARBOR-SUPPORTING JACK FOR MACHINE TOOLS
Filed July 21, 1955
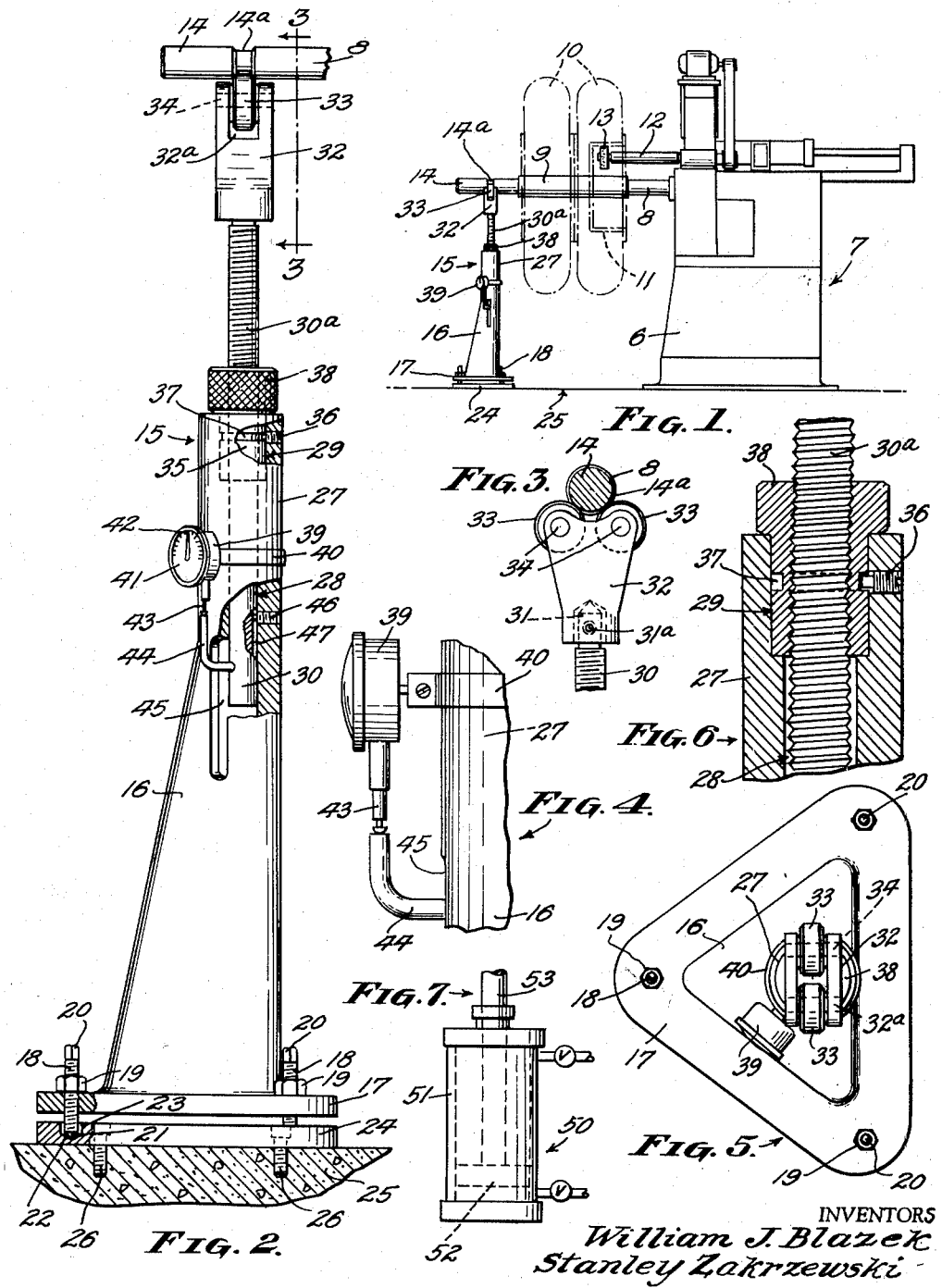
INVENTORS
William J. Blazek
Stanley Zakrzewski
BY
ATTORNEY

United States Patent Office 2,865,259
Patented Dec. 23, 1958

2,865,259

ARBOR-SUPPORTING JACK FOR MACHINE TOOLS

William J. Blazek, New Lexington, and Stanley Zakrzewski, Bremen, Ohio, assignors to Lempco Products, Incorporated, Bedford, Ohio, a corporation of Ohio Application July 21, 1955, Serial No. 523,423

5 Claims. (Cl. 90—20)

This invention is concerned with an improved auxiliary support for use in maintaining in centered positions the rotatable wheel-carrying arbors of brake drum lathes. In its more general aspects, however, the supporting appliance of the present invention is applicable to other types of machine tools, especially those having elongated, work-supporting and turning shafts, arbors or spindles.

Brake drum lathes of this type are employed for restoring to true roundness unevenly worn or distorted brake drums of motor vehicle wheels. This is done by the operation of lathe-carried cutting tools in a manner reestablishing axial concentricity of the brake shoe-engaging surfaces of such drums. Vehicle wheels containing such worn drums are mounted on rotatable spindles or arbors and caused to rotate about a central axis, in order that their worn, uneven or out-of-round surfaces may be machined by one or more lathe-carried cutting tools and restored to true circular form. Such vehicle wheel assemblies, particularly truck wheels of either single or dual types, often with tires mounted thereon, present considerable weight and bulk. When such assemblies are mounted on elongated lathe arbors, the latter are, even when very securely supported for rotation in bearings provided therefor in the lathe frames, apt to deflect longitudinally as a cantilever. Such arbor deflection often objectionably interferes with true rotation of a wheel or wheels mounted on the arbor, preventing proper presentation of the brake shoe-contacting surfaces of the wheel drums to independently mounted cutting tools. Thus, a 600 pound wheel assembly has been found to deflect the unsupported end of an arbor in excess of $1/16$ part of an inch, even when the arbor is of the largest diameter employed in tools of this kind.

Such lathes as originally formed for relatively light-weight wheels did not need a tail stock support for their arbors, as shown in the Blazek et al. Patent No. 2,095,225 of October 12, 1937, but as the weight of wheels and tires has increased, such arbor support has become increasingly necessary. Use is sometimes made of a tailstock of conventional base-mounted formation. Often, however, these tailstocks are so disposed as to interfere with the operations of mounting vehicle wheels on and removing the same from their associated arbor supports. In the prior co-pending application, Serial No. 343,747, filed March 20, 1953, now abandoned, however, it was disclosed a brake drum-turning lathe in which the tailstock thereof is pivotally mounted on the lathe for bodily swinging movement transversely of the lathe between an active, upright, arbor-supporting position and a substantially horizontal, inactive, prone position, with the tailstock lying at one side of the lathe bed, thereby providing access to the lathe arbor or spindle in facilitating wheel mounting and removal over conventional, fixed, base-carried tailstocks.

The present invention aims to simplify and further improve such constructions by providing an auxiliary arbor support which is adapted to be removably positioned when in use on a prepared base, and which when not in use is sufficiently light in weight so that it may be bodily lifted and completely removed to an out-of-the-way location, thereby providing greater freedom of movement on the part of the lathe operator in executing wheel-mounting and dismounting operations and in moving about the lathe.

Another aim or object of the invention is to provide an outer end support for projecting lathe arbors wherein the support is formed to provide an upright pedestal-forming body, the latter being constructed to include at the top thereof a vertically extending bore in which is mounted, for convenient vertical adjustment, the depending stem of a head, carrying spaced cradling rollers, for receiving and supporting the outer projecting end of an associated arbor in a manner precluding arbor flexure when in use.

A further object is to provide in connection with such a head-carrying stem of an auxiliary lathe arbor support, an improved gage-operating means, the latter providing a convenient means for ascertaining given positions of operative adjustment of the arbor-engaging head, so that such positions may be accurately determined and maintained in operation in which the head is moved intermittently into and out of engagement with the arbor.

A still further object is to provide a removable support for the outwardly projecting ends of work-supporting machine tool arbors which constitute an improvement generally in the art, and, also, one which is characterized by its structural simplicity, low cost, light weight, and the ease and convenience by which it may be manipulated when being placed into and out of arbor engagement.

For a further understanding of the invention, reference may be had to the following description, the appended claims and the accompanying drawing, wherein:

Fig. 1 is a side elevational view of an auxiliary support, formed in accordance with the present invention, for the projecting outer end of a brake drum lathe;

Fig. 2 is a similar view on an enlarged scale, showing the arbor support by itself, portions of the support pedestal being broken away and shown in section to disclose internal construction;

Fig. 3 is a detail, fragmentary, front elevational view of the vertically adjustable, arbor-cradling, rollered head of the support;

Fig. 4 is a detail side elevational view disclosing a laterally projecting stem-carried arm of the support in operating engagement with an actuating element of a pedestal mounted, position-determining gage;

Fig. 5 is a top plan view of the support;

Fig. 6 is a detail vertical sectional view taken through the stem-adjusting nut construction; and Fig. 7 is a detail view disclosing a modified form of the invention in which a fluid-actuated jack mechanism is utilized.

Referring to the drawing by reference characters, the numeral 6 designates the frame-forming housing of a brake drum-turning lathe 7. The housing includes an externally and horizontally projecting power-driven arbor or spindle 8 which is formed to receive interchangeably any one of a plurality of differently proportioned work-supporting adaptor sleeves 9. These sleeves constitute longitudinal continuations of the spindle with which they are carried in adapting the same for the reception of different styles or types of motor vehicle wheels, for example, the dual tire-carrying truck wheels shown at 10.

To true the shoe-engaging surfaces of the brake drums 11 of such wheels, the lathe includes a rotary, power-driven shaft 12 carrying a cutting or other tool 13 on its outer end for engagement with the surface of a drum 11. As the wheel assembly is axially rotated by the arbor or spindle 8 and sleeve 9, the cutting tool is moved across the shoe-engaging surface of the brake drum to overcome the defects present therein as a result of service, thereby restoring its true axial concentricity.

To support the outwardly projecting overhanging outer end 14 of the arbor or spindle 8, if the later projects through and beyond the sleeve 9 as here shown, the present invention provides a removable, auxiliary, arbor-supporting appliance 15. This appliance, in the embodiment thereof illustrated, comprises a pedestal 16 which, advantageously may be formed from a cast aluminum, or an alloy thereof. At its lower end, the pedestal may possess a substantially triangular configuration, as shown in Fig. 5, and formed with an integral, lateral flange 17. At its three corners, the flange includes vertically disposed, internally threated openings 17 adapted for the reception of adjustable positioning screws shown at 18. The threaded shanks of these screws may carry lock nuts 19 for maintaining given positions of adjustment thereof, the upper ends of the screws being formed with polygonal, wrench-receiving surfaces 20. The lower ends 21 of the screws are shown as being pointed for reception in tapered seats 22 provided at the bottoms of sockets 23 formed in a base plate 24, the latter being embedded in or attached to a base, foundation or floor 25 by means of the anchoring studs, shown at 26. By this construction, the support may be bodily lifted and deposited in position on the base plate 24 or removed therefrom, the registry established by the screws 21 with the sockets 23 serving to provide a reliable guide in the initial positioning of the support, final adjustment being effected by the adjustment of the screws 18 and other means hereinafter defined.

The upper cylindrical end 27 of the support is formed with a vertically extending bore 28, which, at its extreme upper end, terminates in an enlarged counterbore 29. Adapted to be positioned axially of these bores is a cylindrical rod or stem 30. At its upper end, as shown in Fig. 3, the rod or stem is inwardly shouldered and formed with a reduced, tapered end 31 which is receivable in an enlarged socket formed in the lower part of an adjustably movable head 32, the latter being provided with a transverse set screw or pin 31a for uniting the head with the shank end 31.

The upper part of this head is bifurcated at 32a to receive a pair of spindle or arbor-engaging rollers 33, the latter being rotatably mounted on axles 34 carried transversely by the head. The rollers are disposed in relatively spaced, horizontal alignment, so that the same, when properly adjusted, receive between them for cradled support the spindle or arbor 8, holding the same against longitudinal flexure or displacement, and maintaining the arbor in positions establishing therethrough a true longitudinal axis about which the wheel or wheels 10 may rotate. The arbor may be annularly grooved at 14a to receive the upper peripheral portions of the rollers 33.

Below the head 32, the stem 30 is externally threaded at 30a and adjustably received in a bearing sleeve 35 disposed in the counterbore 29. The sleeve may be retained in said counterbore and held against casual removal by the use of a set screw 36, the latter having a reduced inner end which is adapted to be positioned in frictional binding engagement with the wall surfaces of an annular groove 37 formed in the outer wall of the sleeve 35. The upper end of the sleeve 35 is formed with an enlarged, internally threaded collar 38. This collar rests upon the upper end of the cylindrical portion 27 of the pedestal 16. By rotating the sleeve 35 and its collar 38, the same serve to raise and lower the stem 30 and to define and maintain the vertically adjusted, operating relationship between the rollers 32 and the spindle 8.

When an accurate or desired adjustment of the cradling rollers in a given operation has been obtained, such adjustment is determined and indicated on a visual, dial-type gage, such as that shown at 39. In Figs. 2 and 4, it will be noted that the gage is strapped or otherwise adjustably secured, as by a band 40, to the pedestal in a desired but variable operating position thereon. The gage is here disclosed as including a casing having a circumferentially graduated dial 41 over which travels a rotating pointer 42. The movement of the pointer is effected through the operation of a vertically movable actuating stem 43 which, at its lower end, is adapted to engage with an upturned extension provided on an arm 44, the latter being carried by and projecting outwardly and laterally from the lower part of the rod or stem 30. The arm 44 has its inner end joined rigidly with the lower part of the rod or stem 30 for movement in unison therewith, the intermediate part of the arm travelling in a vertical slot 45 formed in the pedestal 16.

With the use of this construction, when the head 32 has been properly adjusted, through turning of the sleeve 35, to effect desired support of the arbor 8, the position of the indicator hand or pointer 42 with relation to the dial graduations 41 may be noted. Then, if the adjustment of the rod or stem 30 is lost, as a result, for example, of the removal of the appliance from its operating position, or from other causes, the appliance when finally replaced may have its rod or stem readjusted to a position restoring the same to the aforesaid desired position, the fact of such restoration being determined readily by a simple gage reading. The rod or stem is held against rotation in the bore 28 by the provision of a pedestal-mounted set screw 46 which has its reduced inner end received in an elongated groove or channel 47 provided in the stem 30. The set screw 46 permits of vertical movement of said rod or stem relative to the pedestal upon rotation of the sleeve 35, but prevents rotary movement of the stem, thus securing and maintaining adjustments of the rod or stem produced by the rotation of the sleeve 35 through manipulation of the collar 38 thereof.

While in a simple mechanical form of our appliance, the threaded adjusting means above described may be used advantageously in the adjustment of the telescopic base and arbor-engaging members, yet it will be understood that other position-varying means may also be utilized, such as the fluid-actuated jack mechanism indicated at 50 in Fig. 7. In this arrangement the base member 16 is formed to include a fluid cylinder 51 containing a piston 52 from which projects a vertical stem 53 carrying the roller head 32 at its upper end. Valved fluid inlets and outlets 54 and 55 are connected with the cylinder 51 to govern the rise and fall of the piston 52 and stem 53.

In view of the foregoing, it is believed that the construction and operation of the illustrated embodiments of our improved auxiliary, lathe arbor support will be readily understood and, therefore, a more extended description thereof has been omitted. It will, also, be appreciated that the constructions employed in the illustrated embodiments are exemplary of but certain forms of the appliance, and are subject to certain variation or modification without departing from the spirit and scope of the appended claims.

We claim:

1. An auxiliary support for projecting work-mounting and rotating arbors of machine tools, comprising: a pedestal; a socketed base plate; vertical positioning screws adjustably carried by the lower part of said pedestal, the lower ends of said screws having removable bearing contact with individual sockets provided therefor in said base plate; the upper part of said pedestal being formed with a vertically extending bore; a vertically adjustable threaded stem slidably and non-rotatably mounted in said bore; an internally threaded sleeve rotatably positioned in said bore in engagement with the threaded part of said stem; pedestal carried means confining said sleeve for rotation in said bore to provide for vertical adjustment of said stem; a head carried on the upper part of said stem; spaced arbor-engaging and supporting rollers carried by said head; and indicator means responsive to the movement of said stem for indicating positions of vertical adjustment thereof.

2. A portable pedestal-type support for machine tool arbors comprising a vertically arranged, bottom pedestal member having a base-engaging lower end portion; an elongated stem member telescopically carried in said pedestal member and extending vertically outwardly from the upper end of said pedestal member; means carried by said pedestal member engaging said stem member operable to move the latter vertically with respect to said pedestal member; an arbor-supporting head carried by said stem member, said head including relatively spaced antifriction roller elements defining a cradle support for the reception of a rotary arbor; and visual indicator means actuated by the movement of said stem member for indicating positions of vertical adjustment of the latter relative to said pedestal member.

3. A portable, pedestal-type support as defined in claim 2, wherein the lower end portion of said pedestal member is provided with a plurality of relatively spaced, vertically extensible leveling and indexing screws engageable with an associated supporting base and adjustable to maintain said support in desired perpendicular, vertical relation to an associated arbor.

4. A portable, pedestal type support as defined in claim 2, wherein said indicator means comprises a visual gage adjustably mounted on the outer surface of said pedestal member and provided with a movable gage-actuator stem, and an arm carried by said stem member extending outwardly through a slot formed in said pedestal member and engaging the movable gage-actuator stem.

5. A portable, pedestal-type support as defined in claim 2, wherein said stem member is externally screw-threaded and is mounted within said pedestal member for non-rotative vertical sliding movement, and said means operable to move said stem comprising an internally threaded collar rotably carried at the upper end of said pedestal member and threadedly engaged with said stem, said collar being normally rotatable to move said stem vertically relative to said pedestal member.

References Cited in the file of this patent

UNITED STATES PATENTS

| | | |
|---|---|---|
| 764,491 | Newlore | July 5, 1904 |
| 964,394 | Coddington | July 12, 1910 |
| 1,506,107 | Brophy | Aug. 26, 1924 |
| 1,506,108 | Brophy | Aug. 26, 1924 |
| 1,657,732 | White | Jan. 31, 1928 |
| 2,239,259 | Turrettini | Apr. 22, 1941 |
| 2,542,616 | Barrett | Feb. 20, 1951 |
| 2,614,224 | Wright | Oct. 14, 1952 |
| 2,661,653 | Castiglia | Dec. 8, 1953 |
| 2,684,222 | Miller | July 20, 1954 |
| 2,691,914 | Roby | Oct. 19, 1954 |
| 2,733,330 | Blewett | Jan. 31, 1956 |